United States Patent
Lee et al.

(10) Patent No.: US 9,174,307 B2
(45) Date of Patent: Nov. 3, 2015

(54) SUBSTRATE CUTTING APPARATUS AND METHOD FOR CUTTING SUBSTRATE USING THE SAME

(75) Inventors: Hyun-Chul Lee, Yongin (KR);
Won-Kyu Lim, Yongin (KR);
Joon-Hyung Kim, Yongin (KR);
Jae-Seok Park, Yongin (KR);
Cheol-Lae Roh, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 454 days.

(21) Appl. No.: 12/805,004

(22) Filed: Jul. 7, 2010

(65) Prior Publication Data

US 2011/0049764 A1 Mar. 3, 2011

(30) Foreign Application Priority Data

Sep. 2, 2009 (KR) ............ 10-2009-0082596

(51) Int. Cl.
| | | |
|---|---|---|
| B29C 35/08 | (2006.01) | |
| B23K 26/08 | (2014.01) | |
| B23K 26/06 | (2014.01) | |
| B23K 26/073 | (2006.01) | |
| B23K 26/14 | (2014.01) | |
| B23K 26/30 | (2014.01) | |
| C03B 33/04 | (2006.01) | |
| C03B 33/09 | (2006.01) | |

(52) U.S. Cl.
CPC ......... *B23K 26/0807* (2013.01); *B23K 26/0604* (2013.01); *B23K 26/0635* (2013.01); *B23K 26/0738* (2013.01); *B23K 26/0853* (2013.01); *B23K 26/1405* (2013.01); *B23K 26/421* (2013.01); *C03B 33/04* (2013.01); *C03B 33/091* (2013.01); *C03B 33/093* (2013.01)

(58) Field of Classification Search
CPC .................................................. B23K 26/0807
USPC ........................................ 359/199.1; 264/400
See application file for complete search history.

(56) References Cited

U.S. PATENT DOCUMENTS

| | | | |
|---|---|---|---|
| 5,254,833 A * | 10/1993 | Okiyama | 219/121.68 |
| 6,559,411 B2 | 5/2003 | Borgeson et al. | |
| 2002/0023903 A1* | 2/2002 | Ngoi et al. | 219/121.68 |
| 2007/0062919 A1* | 3/2007 | Hamada et al. | 219/121.71 |
| 2007/0121682 A1* | 5/2007 | Ichikawa et al. | 372/9 |
| 2009/0059179 A1* | 3/2009 | Kobori et al. | 353/52 |

FOREIGN PATENT DOCUMENTS

| | | |
|---|---|---|
| JP | 04-178289 A | 6/1992 |
| JP | 06-039572 A | 2/1994 |
| JP | 2002-096188 | 4/2002 |
| JP | 3 323 987 B2 | 7/2002 |
| JP | 2005-179154 | 7/2005 |
| JP | 2005-212364 | 8/2005 |

(Continued)

*Primary Examiner* — Galen Hauth
(74) *Attorney, Agent, or Firm* — Lee & Morse, P.C.

(57) ABSTRACT

A substrate cutting apparatus includes a stage configured to support a substrate, a first laser generator configured to emit a first laser beam toward the substrate, the first laser beam being a short-pulse laser beam, and a beam swing unit disposed on a beam path of the first laser beam, the beam swing unit being configured to swing the first laser beam in a predetermined light irradiating section on the substrate, the light irradiating section on the substrate including at least one of a curved line section and a straight line section.

19 Claims, 6 Drawing Sheets

(56) References Cited

FOREIGN PATENT DOCUMENTS

| | | |
|---|---|---|
| JP | 2005-314127 | 11/2005 |
| JP | 2007-331007 | 12/2007 |
| JP | 2008-080346 | 4/2008 |
| JP | 2008-132616 | 6/2008 |
| JP | 2009-107304 | 5/2009 |
| KR | 10 2000-0050910 A | 8/2000 |
| KR | 10 2006-0030057 A | 4/2006 |
| KR | 10-0681390 B1 | 2/2007 |
| WO | WO-2005102638 A1 | 11/2005 |

* cited by examiner

SUBSTRATE CUTTING APPARATUS AND METHOD FOR CUTTING SUBSTRATE USING THE SAME

BACKGROUND

1. Field

The described technology relates generally to a substrate cutting apparatus and a substrate cutting method thereof. More particularly, the described technology relates generally to a substrate cutting apparatus with a laser beam capable of stably and effectively cutting a glass substrate, and a substrate cutting method using the same.

2. Description of the Related Art

A flat panel display may include an organic light emitting diode (OLED) display and a liquid crystal display (LCD). The flat panel display may be thin, so a substrate cutting apparatus may be required to cut a thin substrate for the thin flat panel display into a desired size.

A conventional substrate cutting apparatus may include a $CO_2$ laser, i.e., as an infrared-base laser for cutting a transparent glass substrate, and a cooling means. That is, the conventional substrate cutting apparatus may apply heat to the substrate along a cutting line by using a $CO_2$ gas laser to generate compression stress. Then, the conventional substrate cutting apparatus may cool the heated portion with the cooling means to generate tensile stress. When this heating/cooling impact, i.e., temperature difference, is applied to the substrate, a minute micro-crack may be generated to facilitate cutting of the substrate.

However, it may be difficult to smoothly generate microcracks by stress caused by a temperature difference as the thickness of the substrate is reduced. Therefore, it may be difficult to cut a thin substrate, e.g., just as a thin glass cup may not be easily broken in hot water.

The above information disclosed in this Description of the Related Art section is only for enhancement of understanding of the background of the described technology and therefore it may contain information that does not form the prior art that is already known in this country to a person of ordinary skill in the art.

SUMMARY

Embodiments are therefore directed to a substrate cutting apparatus and a substrate cutting method thereof, which substantially overcome one or more of the problems due to the limitations and disadvantages of the related art.

It is therefore a feature of an embodiment to provide a substrate cutting apparatus capable of stably and effectively cutting a substrate.

It is therefore another feature of an embodiment to provide a substrate cutting method to stably and effectively cut a substrate.

At least one of the above and other features and advantages may be realized by providing a substrate cutting apparatus, including a stage supporting a substrate, a laser generator emitting a short-pulse laser toward the substrate, and a beam swing unit disposed on a beam path of the laser beam and swinging the laser beam in a predetermined light irradiating section on the substrate. Herein, the light irradiating section includes at least one of a curved line section and a straight line section.

The laser beam swinging by the beam swing unit may physically remove at least a portion of the substrate in the light irradiating section.

The substrate cutting apparatus may further include a transfer unit transferring at least one of the beam swing unit and the stage in the direction parallel to the substrate, wherein the light irradiating section may be moved according to an imaginary cutting line at which the substrate will be cut by the transfer unit.

The imaginary cutting line may include at least one of a straight line, a curved line, a circle, and an oval.

The substrate cutting apparatus may further include an additional laser generator additionally emitting a laser beam to previously heat the substrate before removing the portion of the substrate according to the imaginary cutting line by the laser beam that is swinging by the beam swing unit.

The additional laser generator may be a $CO_2$ laser.

The laser beam may have a wavelength in a range of 200 nm to 900 nm.

The laser beam may have a unit irradiation time of shorter than 50 ps (picoseconds) and a pulse frequency in the range of 0.1 MHz to 100 MHz.

The substrate cutting apparatus may further include a cleaning unit cleaning the region where the substrate is removed by the laser beam.

The substrate may have a thickness of less than 0.3 mm and be made of a glass-based material.

The substrate may have the thickness in a range of 0.4 mm to 1.5 mm and be made of a glass-based material, and both surfaces of the substrate may be processed.

The beam swing unit may swing the laser beam to change an incident angle of the laser beam with respect to the substrate.

The beam swing unit may further include a reflection unit reflecting the laser beam emitted from the laser generator in a direction of the substrate and a driver driving the reflection unit.

The driver may drive the reflection unit by using a plurality of rotation shafts.

The plurality of rotation shafts may include a first rotation shaft and a second rotation shaft intersecting the first rotation shaft.

At least one of the above and other features and advantages may also be realized by providing a substrate cutting method, including mounting a substrate on a stage, irradiating a short-pulse laser beam swinging by the swing unit at a predetermined light irradiating section on the substrate, and moving the light irradiating section according to an imaginary cutting line for the substrate to be cut by transferring at least one of the beam swing unit and the stage, wherein the light irradiating section includes at least one of a curved line section and a straight line section.

The imaginary cutting line may include at least one of a straight line, a curved line, a circle, and an oval.

The laser beam swinging by the beam swing unit may physically remove at least a portion of the substrate in the light irradiating section.

The substrate cutting method may further include cleaning the region where the substrate is removed by the laser beam.

The laser beam may have a unit irradiation time of shorter than 50 ps (picoseconds) and a pulse frequency in the range of 0.1 MHz to 100 MHz.

The laser beam may have a wavelength in a range of 200 nm to 900 nm.

The substrate may have the thickness of less than 0.3 mm and be made of a glass-based material.

The substrate may have a thickness of a range of 0.4 mm to 1.5 mm and be made of a glass-based material, and front and rear surfaces of the substrate may be reversed for both surface processes.

The substrate cutting method may further include previously heating the substrate with an additional laser beam before removing the portion of the substrate along the imaginary cutting line by the laser beam swinging by the beam swing unit, and the additional laser beam may be a $CO_2$ beam.

The beam swing unit may swing the laser beam to change an incident angle of the laser beam with respect to the substrate.

The beam swing unit may further include a reflection unit reflecting the laser beam emitted from the laser generator in a direction of the substrate and a driver driving the reflection unit, and the driver may drive the reflection unit by using a plurality of rotation shafts.

The plurality of rotation shafts may include a first rotation shaft and a second rotation shaft intersecting the first rotation shaft.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
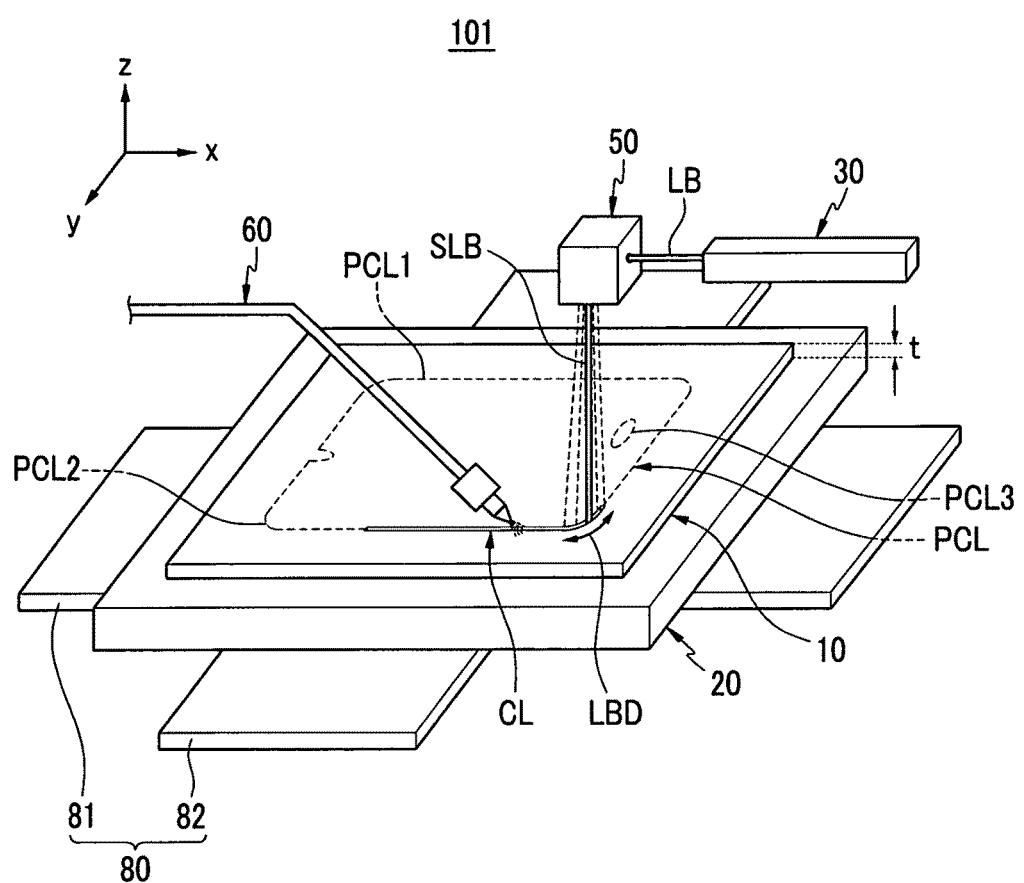
FIG. 1 illustrates a perspective schematic view of a substrate cutting apparatus according to a first exemplary embodiment.

Korean Patent Application No. 10-2009-0082596, filed on Sep. 2, 2009, in the Korean Intellectual Property Office, and entitled: "Substrate Cutting Apparatus and Method for Cutting Substrate Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

A substrate cutting apparatus 101 according to a first exemplary embodiment will be described hereinafter with reference to FIGS. 1-2. As illustrated in FIG. 1, the substrate cutting apparatus 101 may include a stage 20, a laser generator 30, a beam swing unit 50, and a transfer unit 80. Also, the substrate cutting apparatus 101 may further include a cleaning unit 60.

The stage unit 20 may support a substrate 10 to be cut. For example, the substrate 10 may be a glass substrate made of a glass-based material. However, in the first exemplary embodiment, the substrate 10 is not limited to a glass substrate, and may be a substrate made of a non-glass material. The substrate 10 may have a low thickness, e.g., thickness of several hundred microns, in order to be used, e.g., in a flat panel display. For example, the substrate 10 may have a thickness t lower than 0.3 mm, e.g., it may be difficult to cut a substrate having a thickness lower than 0.3 mm by using micro-cracks formed by conventional heat impact.

The substrate 10 may be cut along an imaginary cutting line PCL by using the substrate cutting apparatus 101. For example, the imaginary cutting line PCL may include at least a straight line PCL1, a curved line PCL2, a circle, and an oval PCL3.

The laser generator 30 may emit a laser beam LB toward the substrate 10. The laser beam LB generated in the laser generator 30 may be irradiated toward the substrate 10 to apply an impact on the substrate 10, such that a portion of the substrate 10 may be physically removed. That is, the laser beam LB may be irradiated toward the substrate 10 along the imaginary cutting line PCL, so the substrate 10 may be cut according to the imaginary cutting line PCL.

The laser generator 30 may use a short-pulse laser. Accordingly, the laser beam LB generated in the laser generator 30 may be a short-pulse laser beam. For example, the laser beam LB may have a unit irradiation time that is shorter than about 50 ps (picoseconds) and a pulse frequency within a range of about 0.1 MHz to about 100 MHz. When the laser beam LB has a unit irradiation time greater than 50 ps and/or a pulse frequency outside the range of about 0.1 MHz to about 100 MHz, the laser beam LB may cause excessive thermal damage to the substrate 10. In this case, an undesired crack may be generated in the cut cross-section of the substrate 10, or a circumference of the cut cross-section may be damaged.

Also, the laser beam LB emitted from the laser generator 30 may have a wavelength in a range of about 200 nm to about 900 nm. The laser beam LB may be relatively easily absorbed into the substrate 10, e.g., into a glass-based material, when the laser beam LB has a wavelength in a range of about 200 nm to about 900 nm. The characteristics of the laser beam LB may be determined as a preferable range to stably cut the substrate 10 by using a swinging laser beam SLB to be described in detail below.

The beam swing unit 50 may be disposed on a light path of the laser beam LB emitted from the laser generator 30. For example, as illustrated in FIG. 1, the beam swing unit 50 may be adjacent to the laser generator 30, so the laser beam LB emitted from the laser generator 30 toward the substrate 10 may be incident on the beam swing unit 50 before reaching the substrate 10. Therefore, the beam swing unit 50 may swing the laser beam LB within a predetermined light irradiation section LBD of the imaginary cutting line PCL on the substrate 10. That is, the beam swing unit 50 may swing the laser beam LB according to a length direction of the light irradiating section LBD to define a swinging laser beam SLB incident on the substrate 10, such that an incident angle of the swinging laser beam SLB with respect to the substrate 10 may vary within a predetermined range. In other words, the beam swing unit 50 may swing the laser beam LB, such that the swinging laser beam SLB incident on the substrate 10 may swing between edges, e.g., outer most edges, of the light irradiating section LBD multiple times, i.e., a spot region where the swinging laser beam SLB is secondly irradiated may be reciprocated in the light irradiating section LBD. It is noted that a spot region refers to one point secondly irradiated in the light irradiating section LBD by the swinging laser beam SLB. For example, the swinging laser beam SLB may be incident on one spot region in the light irradiating section LBD several tens to several hundreds of times during swinging. It is noted that the dotted lines in FIG. 1 emanating from the beam swing unit 50 toward the light irradiating section LBD represent a section in which the laser beam LB is swinging.

The light irradiating section LBD is the section in which the swinging laser beam SLB is irradiated. The light irradiating section LBD may include at least one of a curved line section and a straight line section. For example, the light irradiating section LBD may include at least a portion of the straight line PCL1 and/or a portion of the curved line PCL2. In addition, the shape of the light irradiating section LBD may change while moving according to the imaginary cutting line PCL at which the substrate 10 is to be cut.

For example, the light irradiating section LBD irradiated with the swinging laser beam SLB may have a length of about 100 mm. Further, the swinging laser beam SLB may swing at a speed of about 0.1 m/s to about 10 m/s in the light irradiating section LBD by the beam swing unit 50. That is, a spot region irradiated by the swinging laser beam SLB may be moved at the speed of about 0.1 m/s to about 10 m/s in the light irradiating section LBD. However, the length and speed described above are not limited thereto, and the length of the light irradiating section LBD and the swing speed of the swinging laser beam SLB may be appropriately controlled according to an energy level of the swinging laser beam SLB, such that cracks may not be generated by heat impact near an incision surface of the substrate 10.

Use of the swinging laser beam SLB incident on the substrate 10 according to example embodiments may, e.g., directly, disconnect the molecule combination in the glass, i.e., in the substrate 10, thereby easily removing a portion of the substrate 10 defined by the light irradiating section LBD, e.g., without a need for generating micro-cracks. In contrast, a conventional short-pulse laser beam, i.e., a laser beam that is not swinging, may not easily and stably remove and/or cut a portion of a substrate having a thickness of several hundred microns, i.e., a substrate used in a flat panel display. For example, a conventional short-pulse laser beam of a high energy level continuously irradiated to a spot region may generate an uncontrolled crack in the substrate by heat impact, so the crack may be randomly formed in a direction intersecting a cutting line of the substrate. Since the cracks caused by a continuous high-energy irradiation to one spot of a substrate may not be controlled, edges of the substrate may be damaged, thereby causing deterioration of the total integrity of the substrate. In another example, a conventional short-pulse laser beam of a low energy level continuously irradiated to a spot region may not generate sufficient heat to form cracks in the substrate, thereby causing difficulties to remove and cut a substrate having a thickness of several hundred microns.

Therefore, use of the swinging laser beam SLB according to example embodiments may provide intermittent irradiation on the substrate 10 in order to facilitate cutting of a substrate having a thickness of several hundred microns. That is, the laser beam LB may swing in the light irradiating section LBD, such that the swinging laser beam SLB may intermittently irradiate one spot region, e.g., without providing continuous high level energy to a same spot. Accordingly, generation of local cracks by excessive heat impact may be suppressed in the portion of the spot region, even though the energy level of the laser beam SLB irradiated on the substrate 10 may be increased. Accordingly, the swinging short-pulse laser beam SLB may provide improved cutting of the substrate 10.

As described previously, the substrate cutting apparatus 101 according to exemplary embodiments may be configured to cut substrates having a thickness lower than 0.3 mm. However, exemplary embodiments are not limited to the above, and the substrate 10 may also have a thickness in a range of about 0.4 mm to about 1.5 mm. For example, when the substrate 10 has a thickness in the range of about 0.4 mm to about 1.5 mm, the substrate cutting apparatus 101 may process both surfaces of the substrate 10. That is, the swinging short-pulse laser beam SLB may be irradiated to one surface of the substrate 10 to form a groove of a predetermined depth, e.g., about half the thickness of the substrate 10, followed by irradiation of the swinging short-pulse laser beam SLB to a same position on an opposite surface of the substrate 10 to form a groove to the predetermined depth on the opposite surface, i.e., reversing the front and the rear surfaces of the substrate 10, thereby completely cutting the substrate 10. As described above, when the substrate 10 has a thickness of over 0.3 mm, the substrate 10 may be effectively cut by using the substrate cutting apparatus 101 according exemplary embodiments. However, when the substrate 10 has a thickness of over 1.5 mm, the cutting time of the substrate 10 may be long, and the substrate 10 may be damaged by the heat impact.

The beam swing unit 50 will be described in more detail below with reference to FIG. 2. FIG. 2 illustrates a detailed schematic view of the beam swing unit 50.

Figure 2:
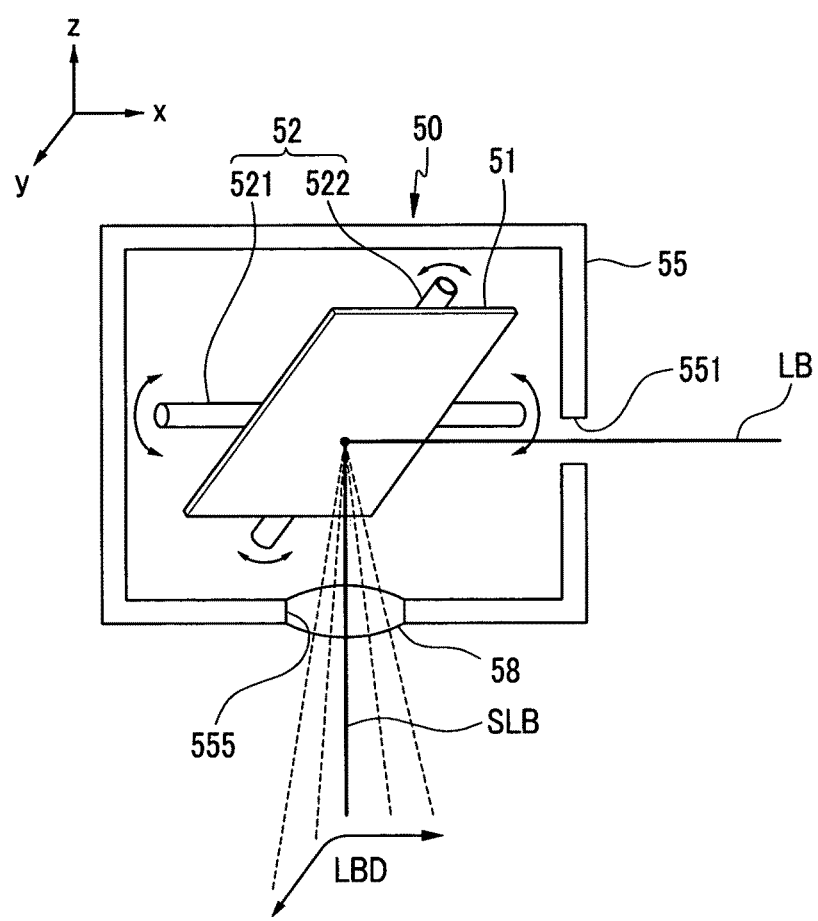
FIG. 2 illustrates an enlarged schematic view of a beam swing unit in FIG. 1.

As illustrated in FIG. 2, the beam swing unit 50 may include a reflection unit 51 and a driver 52 in a case 55. The reflection unit 51 may reflect the laser beam LB emitted from the laser generator 30 toward the substrate 10, and the driver 52 may drive the reflection unit 51. The driver 52 may have a plurality of rotation shafts 521 and 522 to drive the reflection unit 51. It is noted that while the driver 52 is only shown to include the plurality of rotation shafts 521 and 522 in FIG. 2, the driver 52 may also include a motor and a controller. The driver 52 may control a motion of the reflection unit 51 through the plurality of rotation shafts 521 and 522 to swing the laser beam LB emitted from the laser generator 30. The plurality of rotation shafts include a first rotation shaft 521 and a second rotation shaft 522 intersecting the first rotation shaft 521.

The beam swing unit 50 may rotate the reflection unit 51 with the first rotation shaft 521, thereby swinging the laser beam LB according to the straight line section of the x-axis direction. Also, the beam swing unit 50 may rotate the reflection unit 51 with the second rotation shaft 522, thereby swinging the laser beam LB according to the straight line section of the y-axis direction. Further, the beam swing unit 50 may rotate the reflection unit 51 through a combination of the first rotation shaft 521 and the second rotation shaft 522, thereby swinging the laser beam LB according to a curved line section. In addition, the beam swing unit 50 may rotate the reflection unit 51 through a combination of the first rotation shaft 521 and the second rotation shaft 522, thereby swinging the laser beam LB in various angles and directions. The swinging laser beam LB may swing in the light irradiating section LBD.

The driver 52 may selectively control the motion of the reflection unit 51 for the swing speed of the swinging laser beam SLB to be uniform or non-uniform. Further, the driver 52 may selectively control the speed of the reflection unit 51 to be uniform or non-uniform. As described above, the driver 52 may control the motion of the reflection unit 51 to selectively control the swing width and the swing speed of the swinging laser beam SLB.

The case 55 may accommodate the reflection unit 51 and the driver 52. The case 55 may include a beam inflow hole 551 for receiving the laser beam LB emitted from the laser generator 30, and a beam irradiation hole 555 for irradiating the swinging laser beam SLB in the direction of the substrate 10 by way of the reflection unit 51 and the driver 52. For example, referring to FIGS. 1 and 2, the laser beam LB emitted from the laser generator 30 may be transmitted through the beam inflow hole 551 to be incident on the reflection unit 51. Further, the driver 52 may control movement of the reflection unit 51, so the laser beam LB reflected from the reflection unit 51 through the beam irradiation hole 555 toward the substrate 10 may swing, i.e., as the swinging laser beam SLB, multiple times along the light irradiating section LBD on the substrate 10. Here, the swing width of the swinging laser beam SLB may be controlled by the size of the beam irradiation hole 555.

The beam swing unit 50 may further include at least one lens 58 disposed at the beam irradiation hole 555 for the swinging laser beam SLB to have uniform focus in the light irradiating section LBD. In the first exemplary embodiment, the lens 58 may be omitted if necessary.

The substrate cutting apparatus 101 may further include a mask (not shown) to shield a non-uniform region such as in acceleration and deceleration periods due to the turning of the swinging laser beam SLB. Alternatively, the case 55 may be substituted for the mask by controlling the size of the beam irradiation hole 555 of the case 55.

Also, the beam swing unit 50 is not limited to the structure shown in FIG. 2. Accordingly, the beam swing unit 50 may swing the laser beam LB by various optical methods to change the incident angle of the swinging laser beam SLB for the substrate 10.

Referring back to FIG. 1, the transfer unit 80 of the substrate cutting apparatus 101 may be configured to transfer, e.g., move, at least one of the stage 20 and the beam swing unit 50 in a direction parallel to the substrate 10. For example, as illustrated in FIG. 1, the transfer unit 80 may transfer the stage 20 in a direction parallel to the substrate 10. In another example, the transfer unit 80 may transfer the beam swing unit 50. In this case, the transfer unit 80 may also transfer the laser generator 30 along with the beam swing unit 50.

The transfer unit 80 may include a first transfer unit 81 transferring the stage 20 in the x-axis direction and a second transfer unit 82 transferring the stage 20 in the y-axis direction. That is, the transfer unit 80 may transfer the stage 20 in the direction parallel to the substrate 10 through the first transfer unit 81 and the second transfer unit 82.

Also, by controlling movement of the stage 20 (or the beam swing unit 50) via the first and second transfer units 81 and 82, the transfer unit 80 may control movement of the light irradiating section LBD, in which the swinging laser beam SLB is irradiated, along the imaginary cutting line PCL. The imaginary cutting line PCL may be determined in various shapes including at least one of the straight line PCL1, the curved line PCL2, the circle, and the oval PCL3. Also, as illustrated in FIG. 2, the driver 52 of the beam swing unit 50 may drive the reflection unit 51 by the first rotation shaft 521 and the second rotation shaft 522, thereby freely changing the swing pattern of the laser beam LB adjusting to the change of the light irradiating section LBD. Accordingly, the shape of the light irradiating section LBD that is moved according to the imaginary cutting line PCL by the transfer unit 80 may be variously changed according to the shape of the imaginary cutting line PCL. As a result, the substrate cutting apparatus 101 according to the first exemplary embodiment may freely cut the substrate 10 in various patterns.

The cleaning unit 60 may remove contaminants, e.g., unnecessary particles generated while removing portions of the substrate 10 by the swinging laser beam SLB. These contaminants may generate defects, and may disturb the beam path of the laser beam LB. The cleaning unit 60 may remove particles by exhausting or inducing air. The cutting process of the substrate 10 may be finely and quickly executed by using the cleaning unit 60.

The substrate cutting apparatus 101 according to the first exemplary embodiment may stably and effectively cut the substrate 10. In detail, the laser beam LB emitted from the laser generator 30 may be incident on the beam swing unit 50 to be irradiated toward the substrate 10 in a form of a swinging laser beam SLB at the predetermined light irradiating section LBD. The swinging laser beam SLB may physically remove at least a portion of the substrate 10 in the light irradiating section LBD with the beam swing unit 50, e.g., portions of the substrate 10 may be removed without generation of microcracks. That is, portions of the substrate 10 irradiated by the swinging laser beam SLB in the light irradiating section LBD may be gradually removed.

Also, the light irradiating section LBD may be moved according to the imaginary cutting line PCL to cut the substrate 10, while the transfer unit 80 transfers the stage 20. As described above, the substrate 10 may be continuously removed according to the imaginary cutting line PCL, such that the substrate 10 may be finally cut.

Also, the substrate cutting apparatus 101 according to the first exemplary embodiment may cut the substrate 10 by the swinging short-pulse laser beam SLB, such that the substrate 10, i.e., made of a glass-based material and having a thickness of several hundred microns, may be stably cut. As the substrate cutting apparatus 101 does not use a method of generating cracks by heat impact, the substrate 10 having a relatively thin thickness of less than 0.3 mm may be stably and effectively cut.

Figure 3:
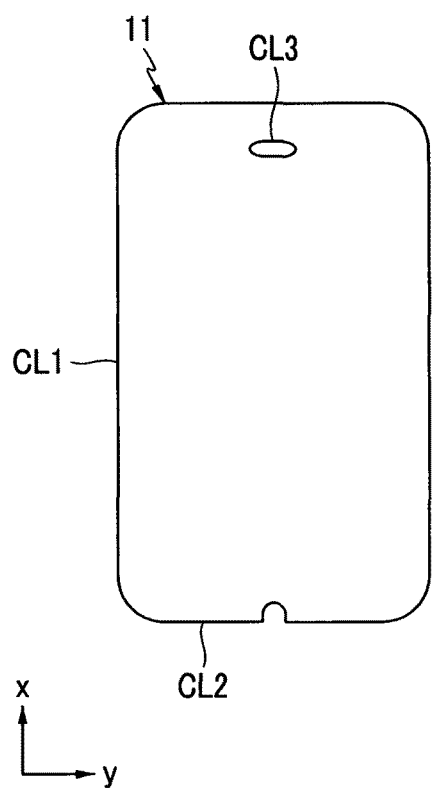
FIG. 3 illustrates a top plan view of a substrate cut by the substrate cutting apparatus in FIG. 1.

FIG. 3 illustrates a view of a protecting glass 11 for a mobile phone made by cutting the substrate 10 with the substrate cutting apparatus 101 according to the first exemplary embodiment. As illustrated in FIG. 3, the substrate cutting apparatus 101 may cut the substrate 10 with various patterns. For example, the protecting glass 11 for the mobile phone may have various incision surfaces CL1, CL2, and CL3, such that the curved line, the straight line, and the oval hole may be effectively formed.

Next, a method of cutting the substrate 10 by using the substrate cutting apparatus 101 of FIG. 1 will be described.

Firstly, the substrate 10 to be cut may be mounted on the stage 20. Here, the substrate 10 may be a glass substrate having a thickness t in the range of about 0.1 mm to about 0.3 mm. However, the thickness of the substrate 10 and its material are not limited thereto.

Next, the swinging short-pulse laser beam SLB may be irradiated on the substrate 10 by the beam swing unit 50 at the predetermined light irradiating section LBD. That is, the beam swing unit 50 may swing the laser beam LB to change the incident angle of the laser beam LB with respect to the substrate 10. Here, the beam swing unit 50 may have the plurality of rotation shafts 521 and 522, and may rotate the reflection unit 51 through a combination thereof to swing the laser beam LB in various angles and directions.

The swinging laser beam SLB may have a wavelength in the range of about 200 nm to about 900 nm. Also, the swinging laser beam SLB may have a unit irradiation time that is shorter than 50 ps and a pulse frequency in the range of about 0.1 MHz to about 100 MHz. The swinging laser beam SLB having the above characteristics may be incident on the substrate 10 in the light irradiating section LBD to disconnect the molecule combination inside the glass, thereby physically removing a portion of the substrate 10.

Also, the light irradiating section LBD may have a length of about 100 mm. Accordingly, the swinging laser beam SLB may swing with a speed of about 0.1 m/s to about 10 m/s in the light irradiating section LBD.

Next, the stage 20 may be transferred by the transfer unit 80 to move the light irradiating section LBD according to the imaginary cutting line PCL to cut the substrate 10. The first exemplary embodiment is not limited thereto, and the beam swing unit 50 may be transferred to move the light irradiating section LBD. A portion of the substrate 10 may be continuously removed, while the light irradiating section LBD is moved according to the imaginary cutting line PCL. The reference numeral CL indicates the cutting line at which the substrate 10 is actually cut.

The imaginary cutting line PCL may include at least the straight line PCL1, the curved line PCL2, the circle, and the oval PCL3. Also, the shape of the light irradiating section LBD that is moved according to the imaginary cutting line PCL may change according to the shape of the imaginary cutting line PCL. That is, the light irradiating section LBD may include at least one of the curved line section and the straight line section. Accordingly, the substrate cutting method according to the first exemplary embodiment may cut the substrate 10 in the various patterns to have the various incision surfaces CL1, CL2, and CL3, e.g., a curved line, a straight line, and an oval hole.

Also, the speed that the transfer unit 80 transfers the stage unit 20 or the intensity of the laser beam LB may be controlled by monitoring the cutting degree of the portion of the substrate 10 that is removed according to the imaginary cutting line PCL.

Next, contaminants, e.g., unnecessary particles generated while cutting the substrate 10 by the swinging laser beam SLB that may disturb the beam path of the laser beam LB, may be removed with the cleaning unit 60.

Through the substrate cutting method, the substrate 10 may be effectively and stably cut. On the other hand, when the substrate 10 has a thickness in the range of about 0.4 mm to about 1.5 mm, i.e., over 0.3 mm, the substrate cutting method according to the first exemplary embodiment may further include processing both surfaces of the substrate 10 by reversing the substrate 10. That is, the swinging short-pulse laser beam SLB may be firstly irradiated to one surface of the substrate 10 to form a groove in the predetermined depth, e.g., about half the thickness of the substrate 10. Next, the front and the rear surfaces of the substrate 10 may be reversed, and the swinging short-pulse laser beam SLB may be irradiated at the same position to completely cut the substrate 10.

As described above, the substrate 10 having the thickness of over 0.3 mm may be effectively cut with the substrate cutting method according to the first exemplary embodiment. However, if the thickness of the substrate 10 is over 1.5 mm, the cutting time of the substrate 10 may be long, and the substrate 10 may be damaged by heat impact.

Figure 4:
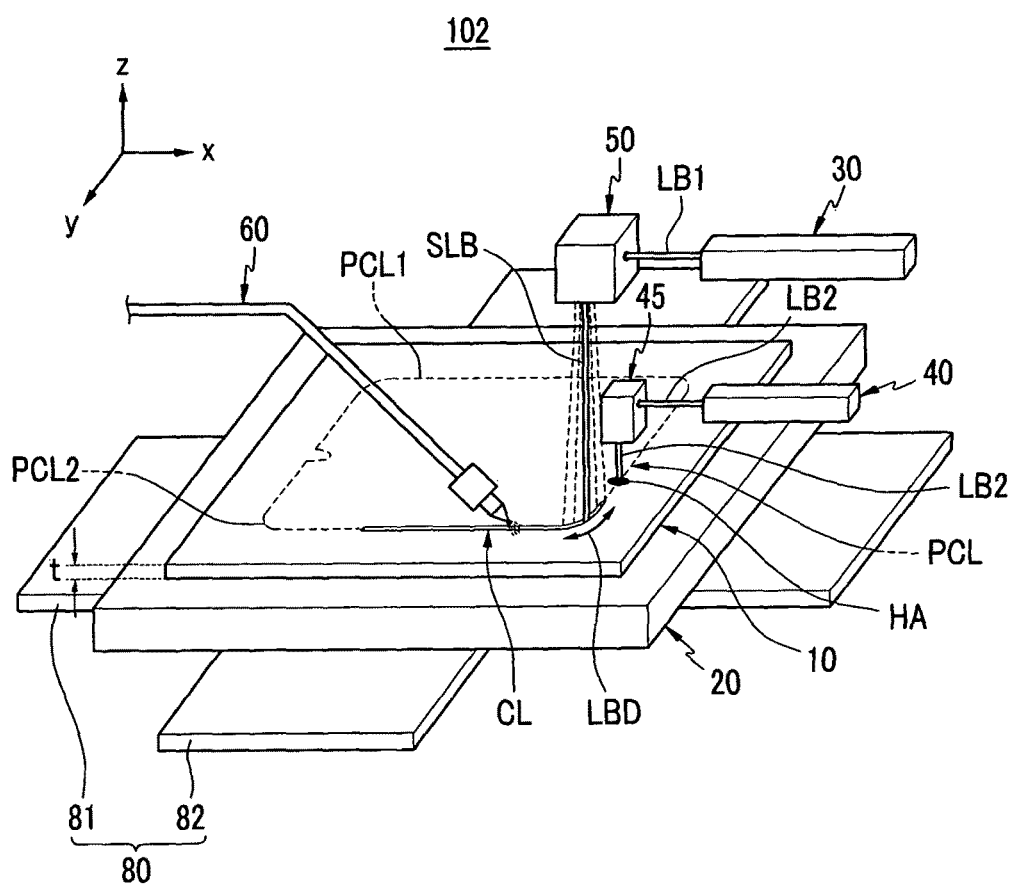
FIG. 4 illustrates a perspective view of a substrate cutting apparatus according to a second exemplary embodiment.
Figure 5:
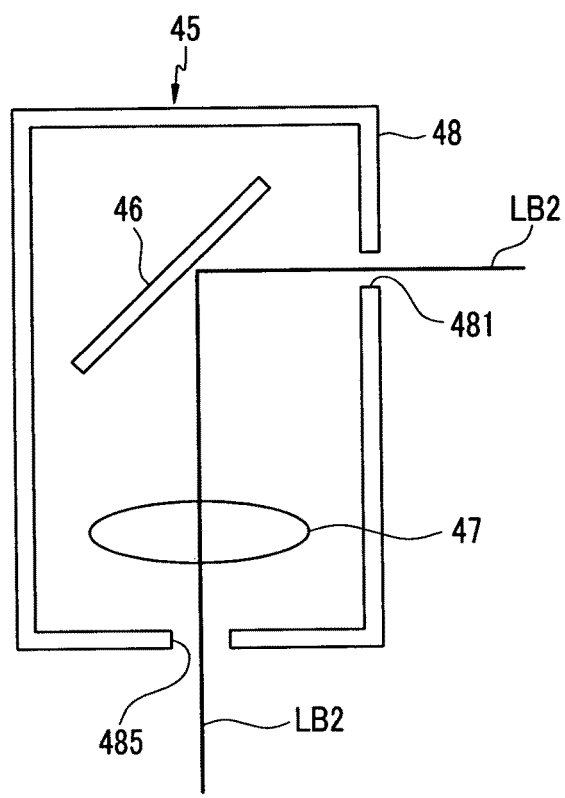
FIG. 5 illustrates an enlarged schematic view of an assistance optical unit in FIG. 4.

Next, a second exemplary embodiment will be described with reference to FIG. 4 and FIG. 5. FIG. 4 illustrates a perspective view of a substrate cutting apparatus according to the second exemplary embodiment, and FIG. 5 illustrates a schematic diagram of an assistance optical unit shown in FIG. 4.

As shown in FIG. 4, a substrate cutting apparatus 102 according to the second exemplary embodiment may be substantially the same as the substrate cutting apparatus 101 described previously with reference to FIG. 1, with the exception of including a second laser generator 40 emitting a second laser beam LB2, in addition to the laser generator 30 emitting the short-pulse laser beam LB1. Hereafter, the laser generator 30 is referred to as the first laser generator 30, and the laser beam LB1 is referred to as the first laser beam LB1.

A $CO_2$ laser may be used as the second laser generator 40. Accordingly, the second laser beam LB2 may be a $CO_2$ laser beam.

The second laser beam LB2 emitted from the second laser generator 40 may pre-heat a portion of the substrate 10 to be irradiated with the swinging laser beam SLB, before emission from the first laser generator 30 removes the portion of the substrate 10 according to the imaginary cutting line PCL. A heating region HA that is heated by the second laser beam LB2 may be moved according to the imaginary cutting line PCL like the light irradiating section LBD. That is, the swinging laser beam SLB may cut the heated substrate 10 after heating by the second laser beam LB2.

The second laser beam LB2 emitted from the second laser generator 40, i.e., the $CO_2$ laser beam, may have a wavelength of about 10,600 nm. The laser beam having the wavelength of 10,600 nm may absorb water molecule or hydroxy materials, and may have absorption for the glass.

Further, the substrate cutting apparatus 102 according to the second exemplary embodiment may further include an optical assistance unit 45. The optical assistance unit 45 may control a path of the second laser beam LB2 emitted from the second laser generator 40, and may condense the second laser beam LB2.

As illustrated in FIG. 5, the optical assistance unit 45 may include an assistance mirror unit 46 controlling the path of the second laser beam LB2, and an assistance condensing unit 47 condensing the second laser beam LB2. At least one of the assistance mirror unit 46 and the assistance condensing unit 47 of the optical assistance unit 45 may be omitted according to the position of the second laser generator 40 and the direction in which the second laser beam LB2 is emitted.

Also, the optical assistance unit 46 may further include an assistance case 48 receiving the assistance mirror unit 46 and the assistance condensing unit 47. The assistance case 48 may include an assistance beam inlet 481 receiving the second laser beam LB2 emitted from the second laser generator 40, and an assistance beam outlet 485 through which the second laser beam LB2 is emitted toward the substrate 10 by way of the assistance mirror unit 46 and the assistance condensing unit 47. However, in the second exemplary embodiment, the assistance optical unit 45 is not limited to the structure shown in FIG. 5.

By such a configuration, the substrate cutting apparatus 102 according to the second exemplary embodiment may stably cut the substrate 10. In detail, the substrate cutting apparatus 102 according to the second exemplary embodiment may control the formation direction of cracks when generating cracks according to the cutting line CL in the process of cutting the substrate 10 according to the imaginary cutting line PCL with the swinging laser beam SLB. That is, the imaginary cutting line PCL on the substrate 10 may be heated by the second laser beam LB2 before being irradiated by the swinging laser beam SLB. Accordingly, although a crack may be generated when the substrate 10 is cut by the swinging laser beam SLB, crack progression in a direction intersecting the cutting line CL may be suppressed. As described above, the crack is induced to be formed according to the cutting line CL to be cut by the second laser beam LB2, such that damage to the incision surface edge of the substrate 10 may be prevented. Accordingly, the substrate cutting apparatus 102 may use the swinging laser beam SLB of a further higher energy level.

Also, the method for cutting the substrate 10 by using the substrate cutting apparatus 102 of FIG. 4, except for the fact that a portion of the substrate 10 is heated by the second laser beam LB2 before irradiating the swinging laser beam SLB to the substrate 10, may be substantially the same as the method for cutting the substrate 10 by using the substrate cutting apparatus 101 of FIG. 1.

Figure 6:
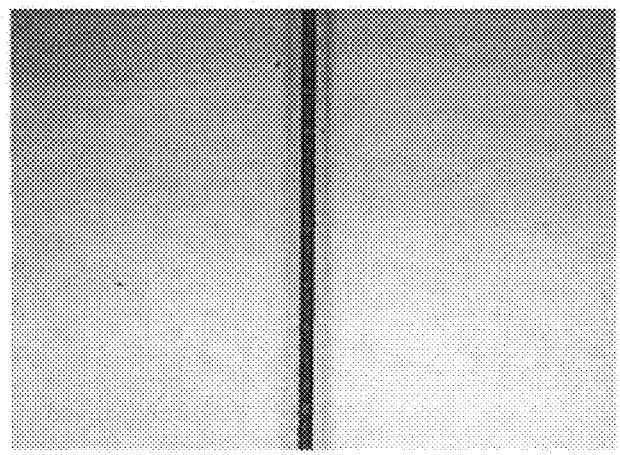
FIG. 6 and FIG. 7 illustrate top plan views of an incision surface of a substrate cut by a substrate cutting apparatus according to an exemplary embodiment and a comparative substrate cutting apparatus, respectively.
Figure 7:
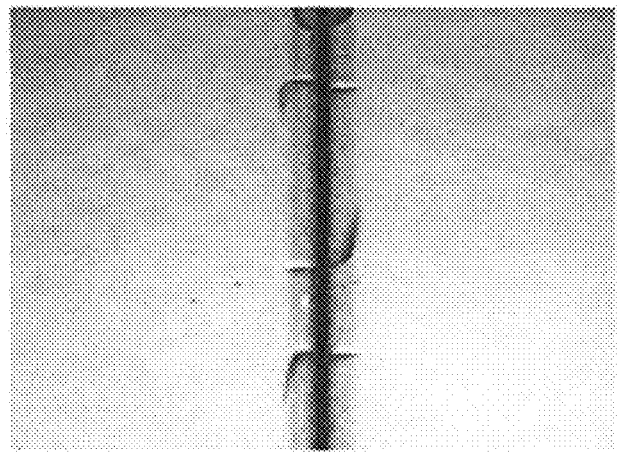

Next, an experimental example and a comparative example will be compared with reference to FIG. 6 and FIG. 7. In the experimental example, the substrate is cut by using the swinging short-pulse laser beam according to the first exemplary embodiment, and in the comparative example, the substrate is cut by using a conventional infrared-based laser beam that is not swinging.

FIG. 6 illustrates a cutting line of a substrate cut through the experimental example. FIG. 7 illustrates a cutting line of a substrate cut through the comparative example.

As illustrated in FIG. 6, the substrate cut through the experimental example has a smooth and stable incision surface of the cutting line. However, as illustrated in FIG. 7, the substrate cut through the comparative example has a non-uniform incision surface of the cutting line and many cracks are generated at the edge thereof.

As a conventional short-pulse laser beam that is not swinging, a laser beam having a high energy level must be continuously irradiated at the spot region to cut a substrate for a flat panel display having a thickness of several hundreds of microns. Thus, a crack may be generated by the local heat impact. The crack may not be controlled, thereby being randomly formed in the direction intersecting the cutting line. If the edge of the substrate is damaged by this crack, the whole integrity of the substrate becomes deteriorated. However, when the substrate is cut by using the swinging short-pulse laser beam according to exemplary embodiments, cracks may be either controlled or not generated, such that stable cutting work may be possible.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A substrate cutting apparatus, comprising:
   a stage configured to support a substrate;
   a first laser generator configured to emit a first laser beam toward the substrate, the first laser beam being a short-pulse laser beam; and
   a beam swing unit disposed on a beam path of the first laser beam, the beam swing unit swinging the first laser beam in a predetermined light irradiating section on the substrate and to reciprocate a beam spot formed by the first laser beam in the predetermined light irradiating section a multiple number of times so as to provide intermittent irradiation to a spot region of the predetermined light irradiating section, the light irradiating section on the substrate including a curved line section,
   wherein:
   the beam swing unit includes a reflection unit and a driver, the reflection unit including a reflection surface reflecting the first laser beam emitted from the first laser generator toward the substrate, and the driver driving the reflection unit,
   the driver includes a first rotation shaft and a second rotation shaft intersecting the first rotation shaft, the first and second rotation shafts being parallel with the reflection surface, and
   the driver controls a motion of the reflection unit through the first rotation shaft and the second rotation shaft to swing the first laser beam according to the curved line section.

2. The substrate cutting apparatus as claimed in claim 1, wherein the beam swing unit is configured to physically remove at least a portion of the substrate in the light irradiating section by swinging the first laser beam.

3. The substrate cutting apparatus as claimed in claim 2, further comprising a transfer unit configured to transfer at least one of the beam swing unit and the stage in a direction parallel to the substrate, the light irradiating section on the substrate being configured to move according to an imaginary cutting line of the substrate during the transfer of one of the beam swing unit and the stage.

4. The substrate cutting apparatus as claimed in claim 3, wherein the imaginary cutting line includes a curved line.

5. The substrate cutting apparatus as claimed in claim 2, further comprising a cleaning unit configured to clean a region where a portion of the substrate is removed by the first laser beam.

6. The substrate cutting apparatus as claimed in claim 1, further comprising a second laser generator configured to emit a second laser beam toward the substrate, the second laser beam being configured to heat the substrate before the first laser beam is incident on the substrate.

7. The substrate cutting apparatus as claimed in claim 6, wherein the second laser generator is a $CO_2$ laser.

8. The substrate cutting apparatus as claimed in claim 1, wherein the first laser beam has a wavelength in a range of about 200 nm to about 900 nm.

9. The substrate cutting apparatus as claimed in claim 1, wherein the first laser beam has a unit irradiation time shorter than 50 ps and a pulse frequency of about 0.1 MHz to about 100 MHz.

10. The substrate cutting apparatus as claimed in claim 1, wherein the substrate includes a glass-based material and has a thickness of less than 0.3 mm.

11. The substrate cutting apparatus as claimed in claim 1, wherein:
   the substrate includes a glass-based material and has a thickness of about 0.4 mm to about 1.5 mm, and
   the substrate cutting apparatus performs irradiating, swinging, and moving on two opposite surfaces of the substrate.

12. The substrate cutting apparatus as claimed in claim 1, wherein the beam swing unit is configured to change an incident angle of the first laser beam with respect to the substrate.

13. A substrate cutting method, comprising:
   mounting a substrate on a stage;
   irradiating a first laser beam toward the substrate by a first laser generator, the first laser beam being a short-pulse laser beam;
   swinging the first laser beam by a beam swing unit in a predetermined light irradiating section on the substrate to reciprocate a beam spot formed by the first laser beam in the predetermined light irradiating section a multiple number of times so as to provide intermittent irradiation to a spot region of the predetermined light irradiating section, the beam swing unit being on a beam path of the first laser beam, and the light irradiating section on the substrate including a curved line section; and moving the light irradiating section according to an imaginary cutting line of the substrate by transferring at least one of the beam swing unit and the stage, wherein:

the beam swing unit includes a reflection unit and a driver, the reflection unit including a reflection surface reflecting the first laser beam emitted from the first laser generator toward the substrate, and the driver driving the reflection unit, the driver includes a first rotation shaft and a second rotation shaft intersecting the first rotation shaft, the first and second rotation shafts being parallel with the reflection surface, and the driver controls a motion of the reflection unit through the first rotation shaft and the second rotation shaft to swing the first laser beam according to the curved line section.

14. The substrate cutting method as claimed in claim 13, wherein swinging the first laser beam includes physically removing at least a portion of the substrate in the light irradiating section.

15. The substrate cutting method as claimed in claim 14, wherein irradiating the first laser beam includes irradiating a laser beam having a unit irradiation time shorter than 50 ps and a pulse frequency of about 0.1 MHz to about 100 MHz.

16. The substrate cutting method as claimed in claim 13, further comprising, before irradiating the first laser beam on the substrate, heating the substrate with a second laser beam, the second laser beam being a $CO_2$ beam.

17. The substrate cutting method as claimed in claim 13, wherein swinging the first laser beam includes changing an incident angle of the first laser beam with respect to the substrate.

18. The substrate cutting method as claimed in claim 13, wherein the driver further includes a motor and a controller.

19. The substrate cutting apparatus as claimed in claim 1, wherein the driver further includes a motor and a controller.

* * * * *